US008864589B2

(12) United States Patent
Reiche, III

(10) Patent No.: US 8,864,589 B2
(45) Date of Patent: Oct. 21, 2014

(54) VIDEO GAME WITH REPRESENTATIVE PHYSICAL OBJECT RELATED CONTENT

(75) Inventor: Paul Reiche, III, Novato, CA (US)

(73) Assignee: Activision Publishing, Inc., Santa Monica, CA (US)

(*) Notice: Subject to any disclaimer, the term of this patent is extended or adjusted under 35 U.S.C. 154(b) by 338 days.

(21) Appl. No.: 12/607,057

(22) Filed: Oct. 27, 2009

(65) Prior Publication Data
US 2011/0098092 A1   Apr. 28, 2011

(51) Int. Cl.
A63F 9/24   (2006.01)
A63F 13/98   (2014.01)

(52) U.S. Cl.
CPC ............ *A63F 13/02* (2013.01); *A63F 2300/69* (2013.01); *A63F 2300/65* (2013.01)
USPC .................................. 463/44; 463/9; 463/32

(58) Field of Classification Search
CPC ......... A63F 13/00; A63F 13/12; A63F 13/06; A63F 2009/2489; A63F 2003/00662; A63F 2009/2486; A63F 2300/69; G07F 17/3209
USPC ........................................... 463/32, 39, 9, 44
See application file for complete search history.

(56) References Cited

U.S. PATENT DOCUMENTS

| 5,661,470 | A |   | 8/1997  | Karr            |         |
|-----------|---|---|---------|-----------------|---------|
| 5,766,077 | A |   | 6/1998  | Hongo           |         |
| 5,853,327 | A | * | 12/1998 | Gilboa          | 463/39  |
| 5,873,765 | A |   | 2/1999  | Rifkin et al.   |         |
| 6,056,618 | A |   | 5/2000  | Larian          |         |
| 6,290,565 | B1|   | 9/2001  | Galyean III et al.|       |
| 6,491,566 | B2|   | 12/2002 | Peters et al.   |         |
| 6,709,336 | B2|   | 3/2004  | Siegel et al.   |         |
| 6,729,934 | B1|   | 5/2004  | Driscoll et al. |         |
| 6,761,637 | B2|   | 7/2004  | Weston et al.   |         |
| 6,773,325 | B1|   | 8/2004  | Mawle et al.    |         |
| 6,905,391 | B2|   | 6/2005  | Soto et al.     |         |
| 6,965,298 | B2|   | 11/2005 | Feinberg        |         |
| 6,967,566 | B2|   | 11/2005 | Weston et al.   |         |
| 7,001,276 | B2|   | 2/2006  | Shinoda         |         |
| 7,066,781 | B2|   | 6/2006  | Weston          |         |
| 7,081,033 | B1|   | 7/2006  | Mawle et al.    |         |
| 7,297,063 | B2|   | 11/2007 | Fujisawa et al. |         |
| 7,338,377 | B2|   | 3/2008  | Shinoda         |         |

(Continued)

FOREIGN PATENT DOCUMENTS

WO   WO 2005/050948   6/2005

OTHER PUBLICATIONS

Sun, Raymond. "Activision Patent Applications—Prior Art." Apr. 9, 2013. Print.

(Continued)

Primary Examiner — Steve Rowland
(74) Attorney, Agent, or Firm — Klein, O'Neill & Singh, LLP

(57) ABSTRACT

A video game includes a reader that senses the identity of various game objects. Each game object includes an identification device such as an RFID tag. The game objects may be in a form of characters or items, for example structures or articles. Each of the game objects is associated with a animate game character or an inanimate item, for example a structure or article manipulable by an animate game character, in the video game. Game play proceeds depending on what game object is placed on the reader.

9 Claims, 6 Drawing Sheets

(56) References Cited

U.S. PATENT DOCUMENTS

| | | |
|---|---|---|
| 7,387,559 B2 | 6/2008 | Sanchez-Castro et al. |
| 7,397,464 B1 * | 7/2008 | Robbins et al. ............... 345/173 |
| 7,488,231 B2 | 2/2009 | Weston |
| 7,808,385 B2 | 10/2010 | Zheng |
| 7,909,697 B2 | 3/2011 | Zheng |
| 7,982,613 B2 | 7/2011 | Zheng |
| 8,157,611 B2 | 4/2012 | Zheng |
| 2003/0076369 A1 | 4/2003 | Resner et al. |
| 2005/0059483 A1 * | 3/2005 | Borge ............................ 463/29 |
| 2006/0030410 A1 | 2/2006 | Stenton et al. |
| 2007/0093172 A1 | 4/2007 | Zheng |
| 2007/0143679 A1 | 6/2007 | Resner |
| 2007/0211047 A1 * | 9/2007 | Doan et al. ................... 345/419 |
| 2007/0250597 A1 | 10/2007 | Resner et al. |
| 2007/0256716 A1 | 11/2007 | Resner et al. |
| 2008/0119274 A1 * | 5/2008 | Eck et al. ........................ 463/40 |
| 2008/0153594 A1 | 6/2008 | Zheng |
| 2009/0137185 A1 | 5/2009 | Zheng |
| 2009/0197658 A1 * | 8/2009 | Polchin ............................ 463/9 |

OTHER PUBLICATIONS

Sun, Raymond. "Patent Portfolio for Skylanders." Mar. 27, 2013. Print.

* cited by examiner

VIDEO GAME WITH REPRESENTATIVE PHYSICAL OBJECT RELATED CONTENT

BACKGROUND OF THE INVENTION

The present invention generally relates to video games, and more particularly to a video game and a peripheral for a video game.

Video games provide fun and enjoyment for many. Video games allow game players to participate in a variety of simulated activities, including those that the game players may not be able or desire to experience directly, whether due to cost, danger, or equipment concerns, or simply due to an activity being a fantasy activity.

Video games, being generally provided by way of an electronic device and associated display, often lack a physical component by which a player may touch and hold a representative object associated with video game play or otherwise have a physical object representative of video game play. Merely interacting with a displayed simulated environment may not allow game players to fully relate to game play, with an all too distinct definition between a game play world and the world actually inhabited by the game players. Moreover, when the electronic device providing game play action is unavailable, for example when off or used for other purposes, as may often by the case when the electronic device is a personal computer, a reminder of the joy of game play may also be unavailable.

BRIEF SUMMARY OF THE INVENTION

In various aspects the invention provides a video game with machine readable identifier related processing. In one aspect the invention provides a video game system, comprising: an object including a machine-readable identifier, the object having a form representative of an item that is inanimate during video game play; a reader configured to read the machine-readable identifier; and a processor configured by program instructions to add the item that is inanimate during video game play to video game play determine video game states based on the machine-readable identifier, to determine video game character action based at least on user inputs indicative of commands to control a video game character, the video game character action including the video game character generally engaging the item that is inanimate during game play, to provide the video game character an ability based on the item that is inanimate during video game play, and to command display of representations of video game states on a display, the representations including representations of the video game character generally engaging the item that is inanimate during video game play.

Another aspect of the invention provides a video game system, comprising: a plurality of objects, each object including a unique machine-readable identifier and each object having a form representative of a corresponding item that is inanimate during game play; a reader configured to read the machine-readable identifier when the object is near the reader; and a processor coupled to the reader to receive an indication of the machine-readable identifier, the processor configured by program instructions to determine video game states based on the machine-readable identifier and to command display of representations of video game states on a display, the representations including a representation of the item that is inanimate during game play corresponding to the machine-readable identifier and a video game character generally engaging the item that is inanimate during game play, the program instructions including program instructions to provide the video game character an ability based on the machine readable identifier.

Another aspect of the invention provides a computer implemented method providing for video game play, comprising: receiving an indication of a machine readable identifier of a physical object; storing in memory an indication of presence of an inanimate virtual item corresponding to the physical object at a location in a virtual game space of a video game; determining during video game play if the location is currently viewable; commanding display of a representation of the item on a display if the location is currently viewable, the item having a resemblance to the physical object; providing the game character an ability based on the inanimate virtual item; determining during video game play if the inanimate virtual item is being generally engaged by a video game character; and commanding display of the representation of the item as generally engaged by the video game character Another aspect of the invention provides a computer implemented method providing for video game play, comprising: receiving an indication of a machine readable identifier of a physical object; adding a space to a virtual world of video game play based on the identifier; allowing a game character to enter the space in response to user inputs indicative of commands to move the game character into the space; and commanding display of at least portions of the space.

Another aspect of the invention provides a computer implemented method providing for video game play, comprising: receiving an indication of a machine readable identifier of a physical object; adding an article to game play based on the identifier; having a game character generally engage the article in response to user inputs indicative of commands to have the game character generally engage the article; commanding display of the game character generally engaging the article; and providing the game character an ability based on the article generally engaged by the game character.

Another aspect of the invention provides a computer implemented method providing for video game play, comprising: receiving an indication of a machine readable identifier of a physical object; adding an article to game play based on the identifier; having a game character generally engage the article in response to user inputs indicative of commands to have the game character generally engage the article; commanding display of the game character generally engaging the article; and modifying game play to account for the game character generally engaging the article by providing the game character an ability, with the ability dependent on the nature of the article.

These and other aspects of the invention are more fully comprehended upon review of this disclosure.

DETAILED DESCRIPTION

Figure 1:
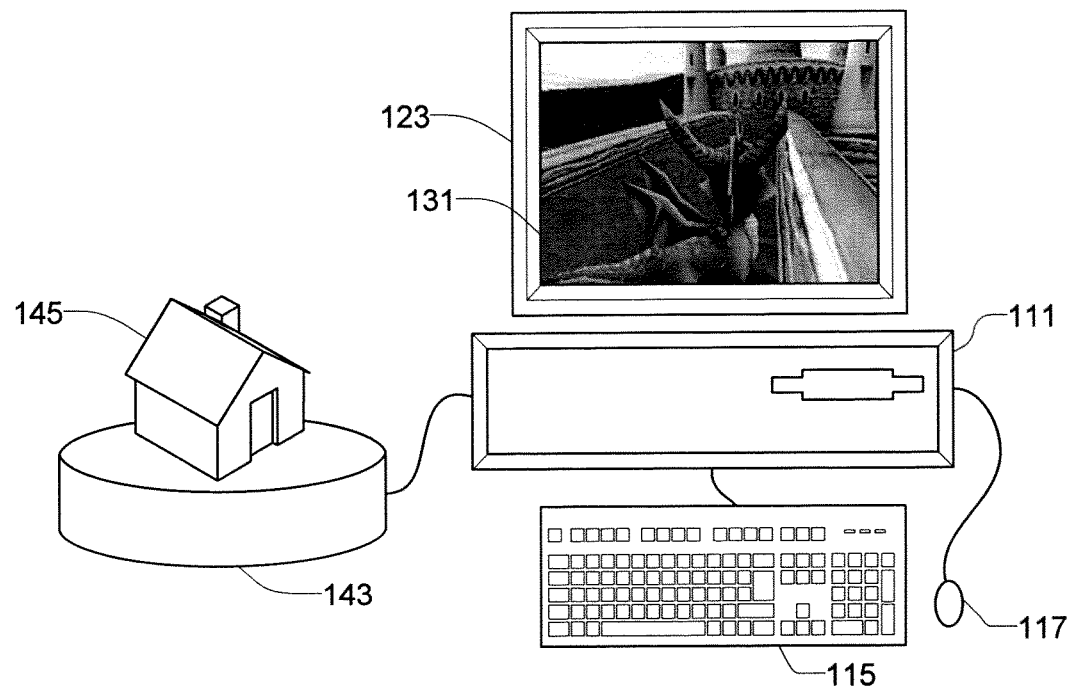
FIG. 1 is an example of a video game system in accordance with aspects of the invention.

FIG. 1 is an example of a video game system in accordance with aspects of the invention. The video game system includes a personal computer 111 with a processor for executing program instructions providing for game play and associated circuitry, user input devices such as a keyboard 115 and mouse 117 or other game controller, a display device 123, and a reader 143. The processor, responsive to inputs from the user input devices and in some embodiments the reader, generally commands display on the display device of game characters in and interacting with a virtual world of game play and possibly each other. In addition, the processor, responsive to inputs from the reader, may also add articles, for example lanterns or flasks, or spaces, such as houses or regions, to the virtual world, with the characters able to manipulate or move about, generally engaging with, the added articles or spaces, as the case may be. For example, the processor may include articles or spaces in game play based on inputs from the reader, and in some embodiments game characters as well, and the processor may control actions and activities of game characters with respect to the articles or spaces based on inputs from the user input devices.

The instructions providing for game play are generally stored on removable media, for example, an optical disk. Accordingly, the personal computer may include an optical drive, for example, a DVD-ROM drive, for reading the instructions for game play. In some embodiments, the personal computer may be a notebook or netbook computer, including similar internal circuitry as herein described, as well as, for example, a built-in display and built-in user input devices, and in some embodiments a game console or the like may be used instead of a personal computer.

The reader, in some embodiments and as shown in FIG. 1, has a substantially flat upper surface for placement of an object thereon. The object includes a machine-readable identifier, for example a radio frequency identification (RFID) tag or a bar code, and an object with a machine readable identifier may be referred to for convenience as a game object. The reader generally includes identification reader circuitry, for example RFID reader circuitry, bar code reader circuitry, or other reader circuitry, processing circuitry in some embodiments, and communication transmitter or transceiver circuitry. The reader circuitry detects the presence of a machine readable identifier on or about the reader. The processing circuitry may execute instructions according to firmware that is also stored in the reader. The processing circuitry may control operation of the reader circuitry, and also process signals from the RFID reader to determine data to be sent to the personal computer. The communication transceiver included in the reader sends reader data to the personal computer. The communication transceiver may send data, for example as controlled by the processing circuitry.

The display device is generally coupled to the personal computer by a cable, although in some embodiments a wireless connection may be used. In many embodiments, the display device is a liquid crystal display. In some embodiments, the display device is a television. A display screen 131 of the display device displays video images of game play, generally as commanded by the processor or other associated circuitry of the personal computer. In the embodiment of FIG. 1, the display screen shows a screen shot of video game play.

As illustrated, the screen shot shows a display of a character, generally controlled by and animated in accordance with user inputs, approaching an inanimate item in the form of what may be considered a castle.

The game player generally places game objects, for example an object 145 in the form and representative of a house as shown in FIG. 1, on a flat surface of the reader during game play. In various embodiments the game objects may include one or more item objects. The item objects are generally in the form of and representative of game items such as game articles or game spaces. The game articles may be, for example, lanterns, swords, flasks, or other articles generally inanimate during game play, with the articles generally at least partially manipulable by game characters. In most embodiments the game articles provide an ability useful to game characters during game play, for example either by way of manipulation by a game character or due to possession by a game character. The ability may be, for example, to provide light for a game character, to provide the game character greater strength or other capabilities, or a variety of other abilities or capabilities useful (or in some cases detrimental) to the game character. The game spaces, which are generally inanimate, and can include, for example, structures, such as houses or castles, landscaping, or areas or regions, for example, of land, which also may contain built-up areas or other features. In most embodiments the game spaces are traversable by game characters. In some aspects, addition of the game spaces can also be considered to provide a game character an ability to enter, traverse, or otherwise explore the game spaces.

In addition, in some embodiments the game objects may additionally include character objects. The character objects are generally in the form of and representative of game characters, which may, through the receipt of user inputs for example, be controlled by a user during game play and may be considered animated characters.

As previously indicated, included in or on each game object is a machine-readable identifier, for example, an RFID tag, that may be sensed or read by the reader. The machine-readable identifier may include a numeric identifier. The machine-readable identifier allows the reader, or the processor of the personal computer, to distinguish one game object from other game objects, and the machine-readable identifier may therefore be considered a game object identifier. In some embodiments each particular game object may have its own separate numeric identifier, for example two otherwise identical item objects in the form of a lantern may each have a unique identifier. In some embodiments, however, identical game objects may have the same numeric identifier, and in other embodiments similar game objects may have the same numeric identifier.

When a game object is read by the reader, the reader provides the personal computer an indication of the identifier of the game object, and generally the processor of the personal computer commands display of a corresponding game character or item or otherwise makes the corresponding game character or item available in game play. For example, when an item object, such as a house, is placed on the reader, the processor may make a corresponding item, in this case a space, such as the space of a house, available for game play or cause game play to transition to or into the corresponding space. Likewise, when a item object in the form of an article such as a lantern is placed on the reader, the processor may make a corresponding article, such as a lantern, appear in the game and the article, such as the lantern, may effect changes or the ability to make changes in the game. In some embodiments the processor may cause placement of the article or space in a predefined location or any one of several predefined locations, based, for example, on predefined selection criteria. Alternatively, placing an item object on the reader may result in different game actions depending on game play state. For example, when an item object in the form of a house is sensed by the reader in a first game state, the processor may make game play transition to a first room of a corresponding house, and when the item object in the form of a house is sensed by the reader in a second game state, the processor may make game play transition to a second room of the corresponding house.

In addition, in some embodiments allowing for use of game characters, when a character object such as a knight is placed on the reader, a corresponding game character, generally animated by user inputs, may appear in the game. In some such embodiments when an item object is sensed by the reader, the processor may cause appearance in game play of a corresponding item approximate a character corresponding to a most recent character object read by the reader, or a character corresponding to a next subsequent character object read by the reader. In various embodiments, therefore, video game play may be affected by use of real world objects, objects which may be utilized for play and/or observation separate from video game play. Moreover, in various embodiments, item objects may be inserted into or made available to or for use by game characters.

Figure 2:
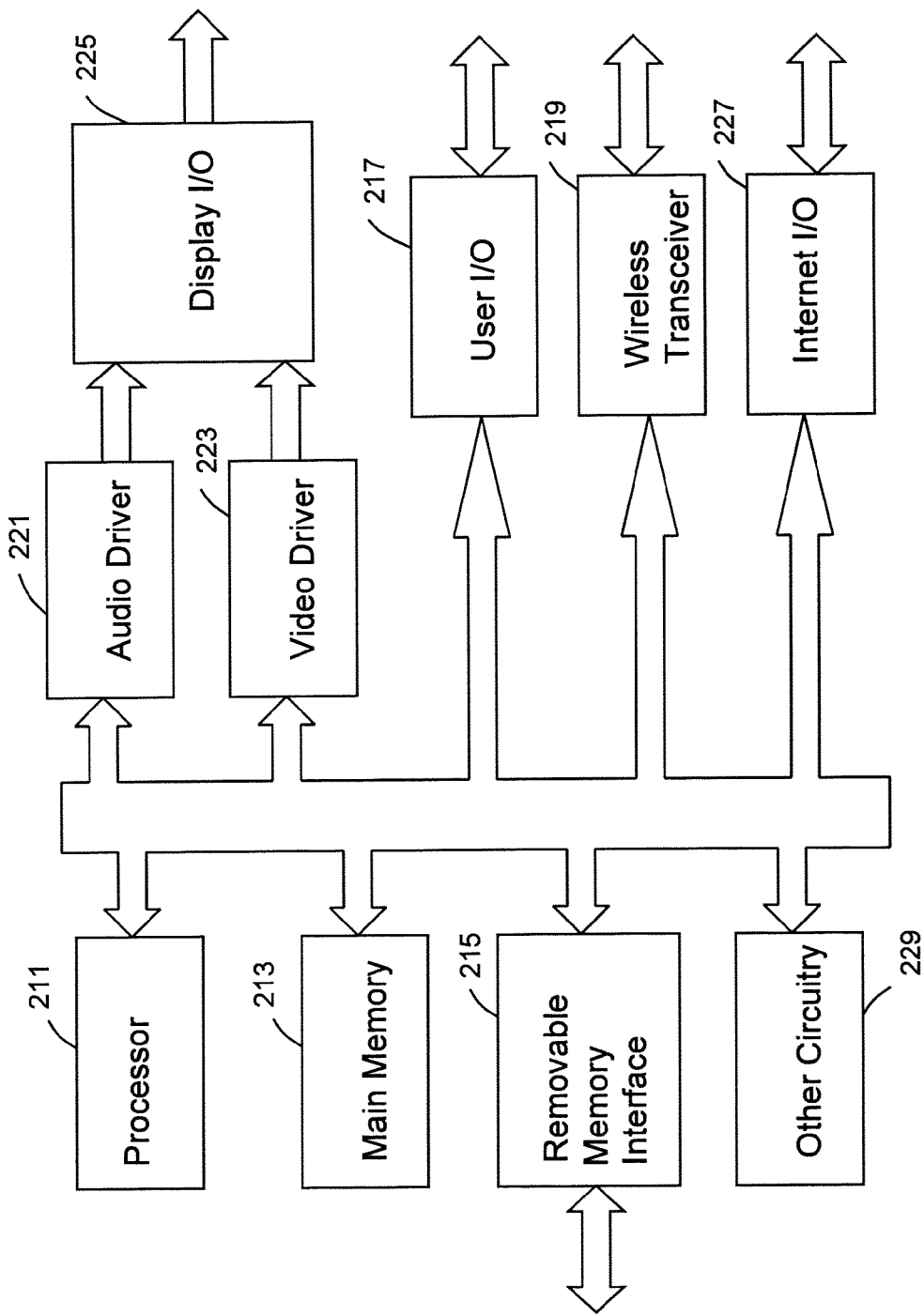
FIG. 2 is an example of a block diagram of a computer processing unit in accordance with aspects of the invention.

FIG. 2 is an example of a block diagram of a processor and associated circuitry, for example for a personal computer, useful in accordance with aspects of the invention. As shown in FIG. 1 a processor 211 is connected to other components via a bus. The other components include a main memory 213 and a removable memory interface 215 generally coupled to a removable memory device, for example, a DVD-ROM drive. The processor may execute instructions from the removable memory device to control game play and store game state information in the main memory. For example, the instructions may be for determining possible movements, positions, and locations of the game character.

The processor is coupled to an audio driver 221 and a video driver 223. The audio driver produces sound signals and the video driver produces image signals. The sound signals and image signals are transmitted from the personal computer via a display I/O device 225. The display I/O device generally supplies the sound and image signals to a display device external to the personal computer.

The processor may also be coupled to a user I/O device 217, a wireless transceiver 219, an Internet I/O device 227, and other circuitry 229. The user I/O device may receive signals from an RF reader and/or signals from a keyboard, a mouse, and/or a game controller, with generally the keyboard, mouse, and/or controller being used by a user and providing user inputs, for example during game play. Alternatively or additionally, the personal computer may receive user inputs via the wireless transceiver. The Internet I/O device provides a communication channel that may be used, for example, for multiple player games.

Figure 3:
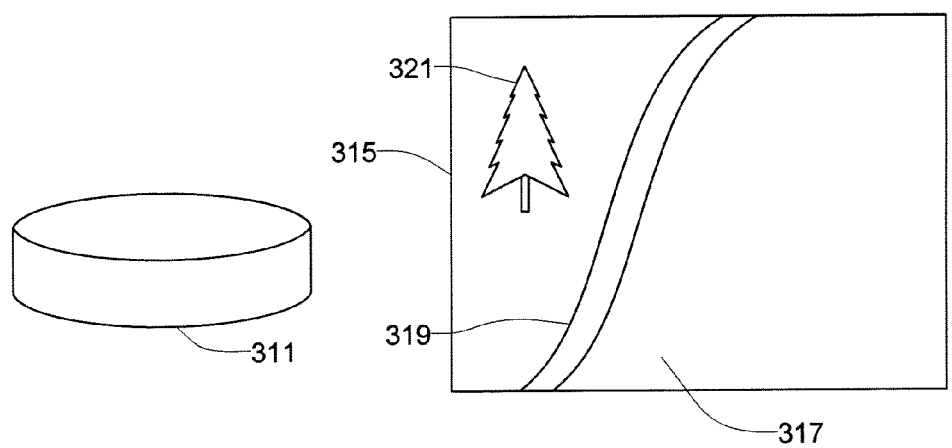
FIG. 3 is an exemplary diagram of a reader and video game display in accordance with aspects of the invention.

FIGS. 3-6 are exemplary diagrams of a reader and displays of a video game in accordance with aspects of the invention. The illustrated readers and video game displays may be part of a video game system as shown in FIG. 1 providing a video game. The video game generally includes characters acting within a virtual world with a current game state specifying status of game play, for example the extent and contents of the virtual world, location of characters within the virtual world, abilities of the characters and other contents of the virtual world, and other aspects of the virtual world. As depicted in FIG. 3, a reader 311 does not have a game object placed on it. The absence of a game object is signaled to a processor (not shown) configured by program instruction to provide for video game play either directly or implicitly by not signaling presence of a game object. A video display 315 associated with the processor may display a sparse scene in response to the absence of a game object on the reader. More generally the scene, if visible in game play, may not include a particular space or article, such as a house or a lantern, if a game object, for example in the form of a house or a lantern, had not been previously placed on the reader during game play. The sparse scene includes, in the illustrated example, a grassy area 317 about a tree 321, with a pathway 319 crossing the grassy area. The illustrated situation may occur, for example, when a player begins the video game or otherwise during game play prior to an item object being placed on the reader.

Figure 4:
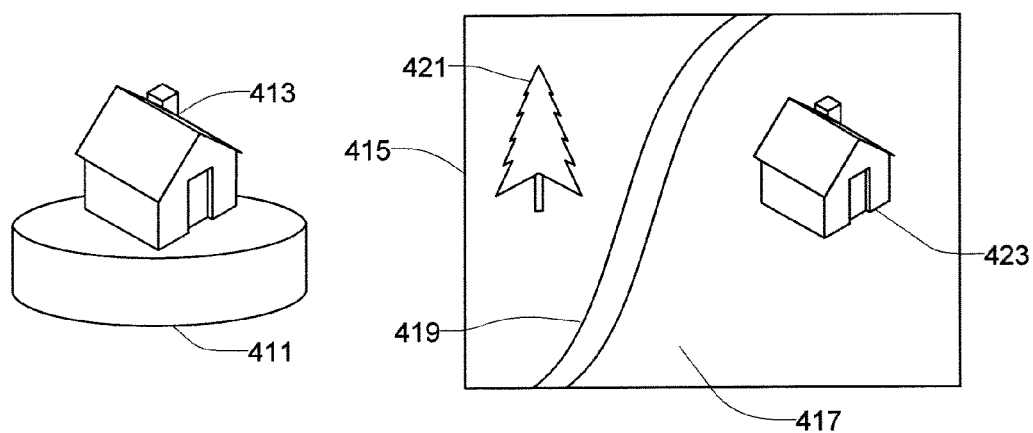
FIG. 4 is an exemplary diagram of a reader and video game display in accordance with aspects of the invention.

As depicted in FIG. 4, a reader 411 has an item object 413 placed on the reader, with, as shown in FIG. 4, the item object being in the form of a house. The reader signals the presence of the item object to a processor (not shown in FIG. 4) executing program instructions providing for video game play. A display 415 associated with the processor may display a scene in response to the signaled presence of the item object on the reader. The scene includes, in the illustrated example, a grassy area 417 about a tree 421, with a pathway 419 crossing the grassy area, and a house 423 on the grassy area and by the pathway. The illustrated situation may occur, for example, once the item object has been placed on the reader. Alternatively, the item object could be an article object in the form of an item, such as a lantern, and the processor may instead command display of a lantern.

Figure 5:
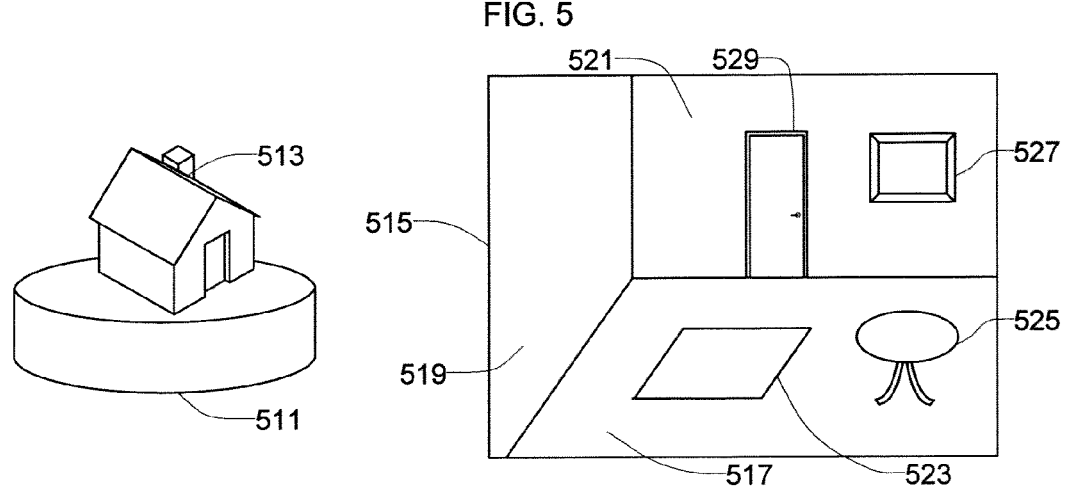
FIG. 5 is an exemplary diagram of a reader and video game display in accordance with aspects of the invention.

As depicted in FIG. 5, a reader 511 has an item object 513, as shown in FIG. 5 in the form of a house, placed on it. The reader signals the presence of the item object to the processor. In addition to the display of a house exterior as illustrated in FIG. 4, the presence of the item object in the form of a house on the reader causes the processor to add the house as a virtual space to game play. A character present in game play may enter and explore, generally engaging, the interior space of the house. Accordingly, a video display 515 associated with the video game may display an interior scene of the house that includes, in the illustrated example of FIG. 5, a room including a floor 517, a left wall 519, and a rear wall 521. The interior scene includes a rug 523 and a table 525 located on the floor and a painting 527 and a door 529 located on the rear wall. In some embodiments, the illustrated situation may occur after the situation illustrated in FIG. 4 and, for example, in response to game player signals from a mouse or game controller causing a game character to enter the house or automatically after a passage of time. Similarly, if the item object is in the form of an article, such as a lantern, the processor may insert a lantern into game play and allow a lantern in the game to be manipulated, including being carried, moved and or used, by a game character. For example, in some embodiments use of a lantern by a game character may provide light for a room or space, and in some embodiments possession of the lantern may give the game character additional capabilities, such as the ability to light a room or space, and in either case the lantern provides the game character the ability to have light generated.

Figure 6:
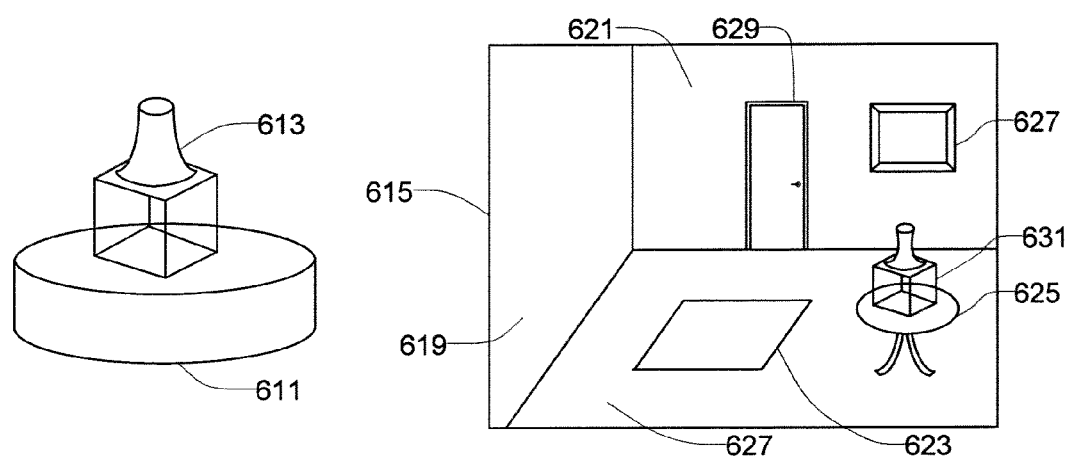
FIG. 6 is an exemplary diagram of a reader and video game display in accordance with aspects of the invention.

As depicted in FIG. 6, a reader 611 has an item object 613 placed on the reader, with, as shown in FIG. 6, the item object being in the form of a lantern. The reader signals presence of the item object to the processor executing program instructions providing for video game play. A display 415 associated with the processor may display a scene in response to the signaled presence of the item object on the reader. The scene as illustrated in FIG. 6 includes the room illustrated in FIG. 5, with the room including a floor 617, a left wall 619, and a rear wall 521. The interior scene includes a rug 523 and a table 525 located on the floor and a painting 527 and a door 529 located on the rear wall and additionally includes a lantern 631 on a table 625. As indicated with respect to FIG. 5, a character present in game play may traverse space within the room, and the character may also carry, manipulate, or otherwise use, generally acting with respect to, the lantern.

Figure 7:
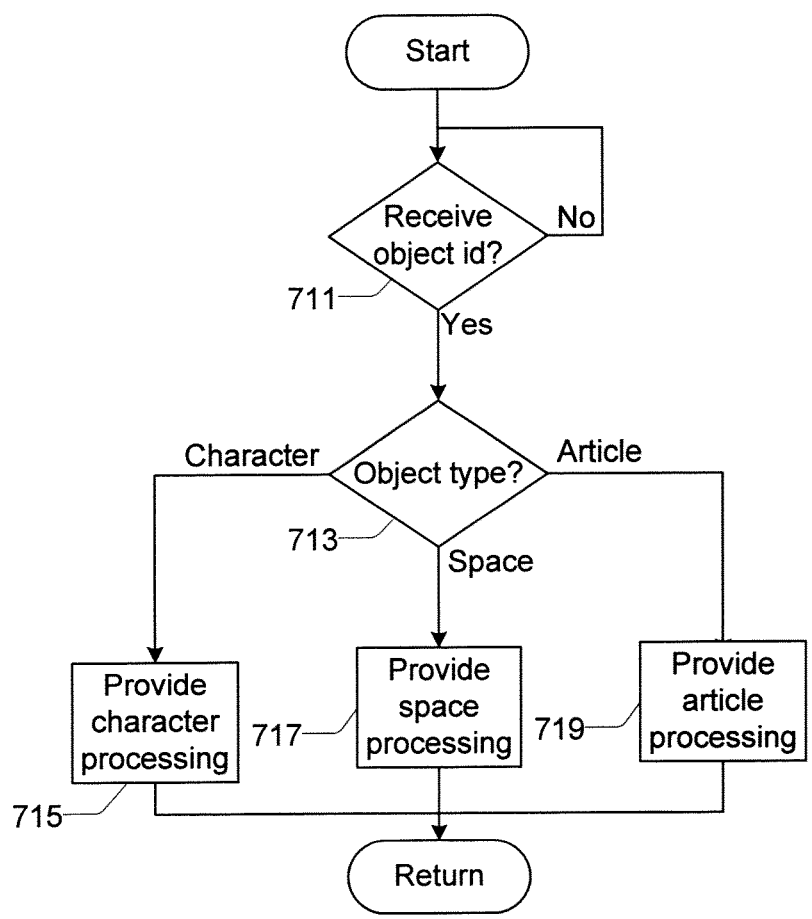
FIG. 7 is a flowchart of a process for processing game reader inputs in accordance with aspects of the invention.

FIG. 7 is a flowchart of a process for processing game reader inputs in accordance with aspects of the invention. In some embodiments, the process is performed by a personal computer executing program instructions, by a reader, or partially by a personal computer and partially by a reader. Additionally, the process may be performed by hardware, software, or a combination of hardware and software. The process utilizes a reader, for example, the reader 143 of the embodiment of FIG. 1. In some embodiments, the reader is an RFID reader.

In block 711, the process tests whether an object identifier has been received. In some embodiments, reception of an object identifier occurs when a personal computer receives a signal from a reader indicating that the reader has sensed an object with an identification device. If an object identifier has been received, the process continues to block 713; otherwise, the process returns to block 711.

In block 713, the process in block 711 determines whether the received object identifier identifies a game character, a space, or an article. In some embodiments, whether the received object identifier identifies a game character, a space, or an article is determined by finding the object identifier in a database of object identifiers. In other embodiments, a portion of the object identifier may directly indicate whether the object identifier identifies a game character, a space, or an article. If the object identifier identifies a character, the process continues to block 715. If the object identifier identifies a space, the process continues to block 717. If the object identifier identifies an article, the process continues to block 719.

In block 715, the process performs character processing. In many embodiments, the process adds a specific character identified by the object identifier into a current game state, and the character may thereafter, generally be animated, in accordance with user inputs. The user inputs animate the character, effectively giving life to the character in game play, and the character may, as commanded by user inputs, possibly generally engage with spaces or articles in or added to game play, for example as discussed below. The process thereafter returns.

In block 717, the process performs space processing. In many embodiments the process adds a specific space, for example a structure or a region, into a current game state, generally providing characters of the game the ability to enter the space. In some game embodiments, the process transitions the game state to a specific virtual location corresponding to a space identified by the object identifier. For example, when the object identifier identifies a house, the game state may transition to a room of the house. In another embodiment, the process inserts or makes available in the game state a structure or space identified by to the object identifier. For example, a structure may be added at predefined location or about a current location of a particular game character. In some embodiments the process inserts regions into a space of game play, and the regions may or may not include built up structures, a variety of items, or various terrains or landscapes. In another embodiment, space processing depends on prior object identifiers received by the process. For example, receipt of an object identifier identifying a character followed by receipt of an object identifier identifying a space may cause the process to locate a corresponding space near the corresponding character. In many embodiments, and for many spaces, characters present in game play, including for example previously added to game play as discussed herein, may enter, traverse, or move about the space added to game play, with the character generally engaging the space. The process thereafter returns.

In block 719, the process performs article processing. In one embodiment, the process adds a specific article identified by the object identifier into a current game state, generally providing a character or characters of the game an ability based on the specific article. For example, when the process receives an object identifier identifying a lantern or potion bottle, the process may add the lantern or bottle to a hand of a character present in game play, for example due to previously being added to game play and subsequently the character may be able to manipulate the lantern to shine a light, for example to illuminate a room, or drink from the bottle, and for example be given additional strength or extended life. Alternatively, the process may place the lantern or bottle in a predefined location in a virtual game space, for example, for a game character to later find or discover. The process thereafter returns.

Figure 8:
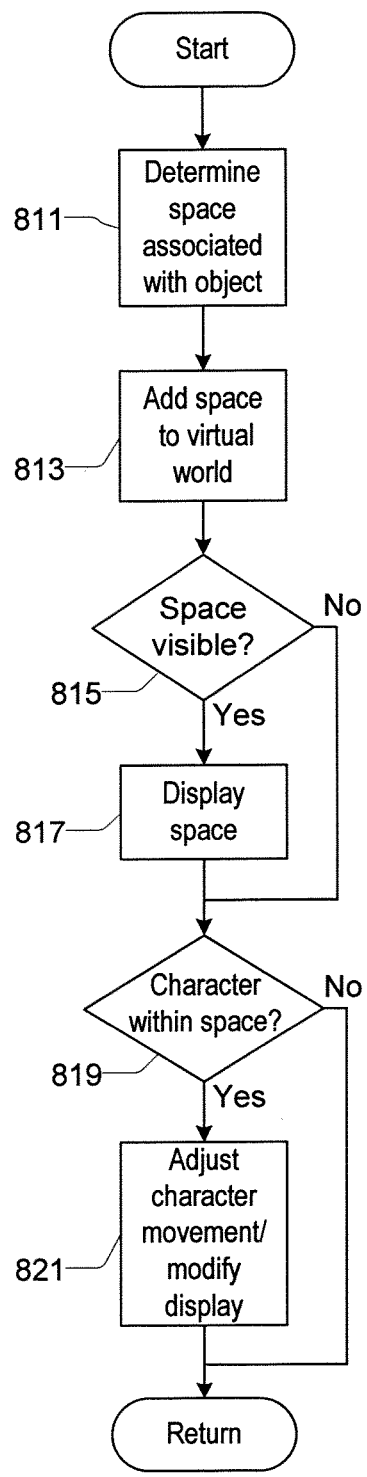
FIG. 8 is a flowchart of a process for processing a game space object in accordance with aspects of the invention.

FIG. 8 is a flowchart of a process for processing related to a space in accordance with aspects of the invention. In some embodiments, the process is performed by a personal computer executing program instructions. Additionally, the process may be performed by hardware, software, or a combination of hardware and software. The process may also be performed in block 717 of the game reader input processing process of FIG. 7.

In block 811, the process determines a space identified by an object identifier. The space may be, for example, a house or castle, or a town or a region, or other space. In some embodiments, the space associated with a space object may be determined by finding the object identifier identifying the space in a database linking object identifiers with spaces.

In block 813, the process adds the space determined in block 811 to the world of the video game. In some embodiments, the process adds the space to a state structure of the video game. In most embodiments addition of the space to the state structure of the video game provides characters the ability to enter the space.

In block 815, the process tests whether the space added in block 813 is visible or viewable in the current game state. In some embodiments, the process determines visibility by comparing the location of the current game state to the location of the added space. In other embodiments, the process determines visibility based on the location of a game character or based on the location and orientation of the game character. If the space is visible, the process continues to block 817; otherwise, the process proceeds to block 819. In block 817, the process displays the space added in block 813. In some embodiments, the process displays the space as illustrated in FIG. 4 or 5.

In block 819 the process determines if a character is within the space. If the character is not within the space the process returns. If the character is within the space the process in block 821 modifies character movements, for example as commanded by user inputs, to account for restrictions on movement of the character within the space, for example due to contours of structures of the space or furnishings of the space, and commands or provides display of such modified movements. The process thereafter returns.

Figure 9:
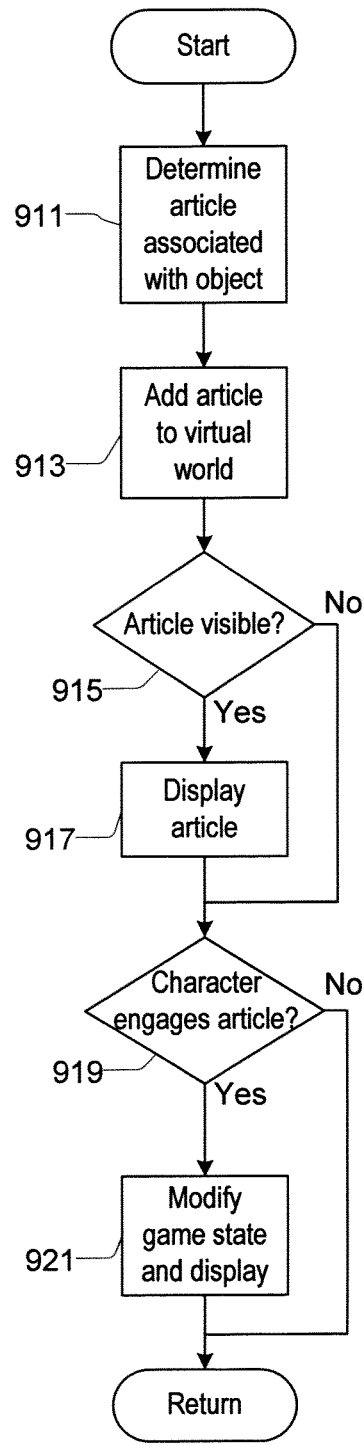
FIG. 9 is a flowchart of a process for processing a game item object in accordance with aspects of the invention.

FIG. 9 is a flowchart of a process for processing related to an article in accordance with aspects of the invention. In some embodiments, the process is performed by a personal computer executing program instructions. Additionally, the process may be performed by hardware, software, or a combination of hardware and software. The process may also be performed in block 719 of the game reader input processing process of FIG. 7.

In block 911, the process determines an article identified by an object identifier. The article may be, for example, a sword or lantern. In some embodiments, the article identified by an object identifier may be determined be finding the object identifier in a database linking object identifiers with articles.

In block 913, the process adds the article determined in block 911 to the world of the video game. In some embodiments, the process adds the article to a state structure of the video game. In some embodiments addition of the article to the state structure of the video game provides or allows a character to obtain additional ability based on the article.

In block 915, the process tests whether the article added in block 913 is visible or viewable in the current game state. In some embodiments, visibility may be determined by comparing the virtual location of the current game state to the virtual location of the added article. In other embodiments, the process determines visibility based on the location of a game character or based on the location and orientation of the game character. If the article is visible, the process continues to block 917; otherwise, the process proceeds to block 919. In block 917, the process displays the article added in block 913. In some embodiments, the process displays the article in a manner similar to the display illustrated in FIG. 5. In other embodiments, the process associates the article with a game character, for example, by displaying the article approximate, for example over, the game character.

In block 919 the process determines if a game character generally engages with the article, for example by manipulating, using, or carrying the article. If the character does not generally engage with the article the process returns. If the character does generally engage with the virtual item the process modifies game play to account for the character's actions with respect to the article, generally by providing the character an ability, which in some embodiments is based on the nature of the article. For example, if the article is a lantern, the character may manipulate the lantern to provide light, or move the lantern to provide light in a specific direction, and the process modifies game play accordingly and commands or provides corresponding displays. Alternatively, using the lantern as an example, in some embodiments possession of the lantern by a character, or in some embodiments past possession of the lantern by the character, may provide the character the ability to generate or cause generation of light in video game play, with the article therefore providing the character a particular ability. Similarly, the article may be, for example, a potion, perhaps in a flask, and the potion may change an attribute of the character, including changing an attribute of the character such that the character can perform in new manners. The process thereafter returns.

Although the invention has been described with respect to certain specific embodiments, it should be recognized that the invention comprises the novel and unobvious claims supported by this disclosure, along with their insubstantial variations.

The invention claimed is:

1. A video game system, comprising:
 a physical object including a machine-readable identification data;
 a reader configured to read the machine-readable identification data when the physical object is near the reader; and
 a processor coupled to the reader, the processor configured by program instructions to:
  receive, via the reader, an indication of the machine-readable identification data;
  retrieve, from a memory, information of a region to add to virtual game space of a video game, the region including an inanimate virtual item corresponding to the physical object at a location in the region, the region not being in the virtual game space prior to receipt of the indication of the machine-readable data, the region including structures and landscapes;
  allow a character to move about the region of virtual game space;
  determine whether the location in the region of virtual game space is currently viewable in a view of the video game presented to a user via a display; and
  command display of representations of video game states on the display, the representations including a representation of the inanimate virtual item responsive to a determination that the location in the region of virtual game space is currently viewable in the view of the video game.

2. The video game system of claim 1, wherein the physical object has the form of a structure, and the representation of the inanimate virtual item includes a representation of the structure.

3. The video game system of claim 2, wherein the representation of the structure includes a representation of an interior of the structure.

4. The video game system of claim 1, wherein the physical object has the form of an article, and the representation of the inanimate virtual item includes a representation of the article manipulable by a video game character.

5. The video game system of claim 4, wherein the processor is further configured by program instructions to associate the article manipulable by the video game character with the video game character.

6. A computer-implemented method of providing video game play, the method being implemented in a system comprising a physical processor, and comprising:
 receiving an indication of a machine readable identification data of a single physical object;
 retrieving, from a memory, information of a region to add to virtual game space of a video game and an indication of presence of an inanimate virtual item corresponding to the physical object at a location in the region, the region not being in the virtual game space prior to receipt of the indication of the machine-readable data, the region including structures and landscapes;
 allow a character to move about the region of virtual game space;
 determining, by the processor, whether the location in the region of virtual game space is currently viewable in a view of the video game presented to a user via a display; and
 commanding, by the processor, display of a representation of the inanimate virtual item responsive to a determination that the location in the region of virtual game space is currently viewable in the view of the video game, the inanimate virtual item having a resemblance to the physical object.

7. The computer-implemented method of claim 6, wherein the inanimate virtual item is an article manipulable by a video game character, the method further comprising:
 determining, by the processor, during video game play whether the inanimate virtual item is being generally engaged by a video game character; and commanding, by the processor, display of the representation of the inanimate virtual item as generally engaged by the video game character responsive to a determination that the inanimate virtual item is being generally engaged by the video game character.

8. The computer-implemented method of claim 6, wherein the inanimate virtual item is a structure.

9. The computer-implemented method of claim 8, further comprising:

commanding, by the processor, display of an interior of the structure if a video game character enters the structure during video game play.

\* \* \* \* \*